Figure 1:
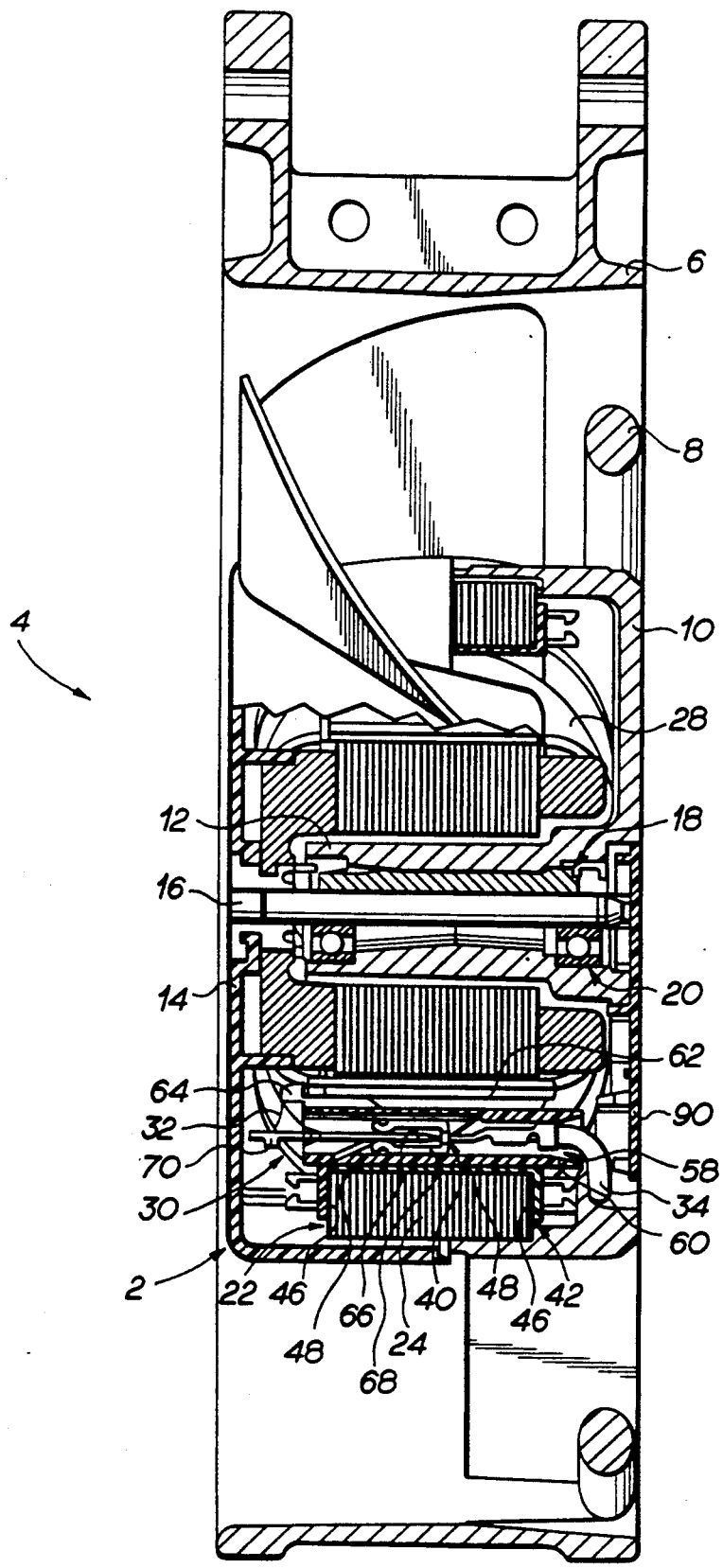

United States Patent [19]

Best

[11] Patent Number: 5,229,674

[45] Date of Patent: Jul. 20, 1993

[54] ELECTRIC MOTOR WITH CONNECTOR PLUG IN STATOR GROOVE

[75] Inventor: Dieter Best, Ingelfingen, Fed. Rep. of Germany

[73] Assignee: ebm Elektrobau Mulfingen GmbH & Co., Fed. Rep. of Germany

[21] Appl. No.: 771,745

[22] Filed: Oct. 4, 1991

[30] Foreign Application Priority Data

Oct. 4, 1990 [DE] Fed. Rep. of Germany ....... 4031440

[51] Int. Cl.$^5$ ......................... H02K 11/00; H01R 4/26
[52] U.S. Cl. ....................................... 310/71; 439/926
[58] Field of Search ............... 310/71, 249, 258, 273, 310/42; 439/345, 346, 544, 894, 926

[56] References Cited

U.S. PATENT DOCUMENTS

| | | |
|---|---|---|
| 3,293,463 | 12/1966 | Church .................................. 310/71 |
| 3,441,759 | 4/1969 | Watkins ................................ 310/71 |
| 3,725,707 | 4/1973 | Leimbach ............................. 310/71 |
| 3,780,323 | 12/1973 | Swain .................................... 310/71 |
| 4,004,169 | 1/1977 | Charlton ............................... 310/71 |
| 4,181,393 | 1/1980 | Lill ..................................... 310/71 X |
| 4,328,438 | 5/1982 | Zolman ............................. 310/71 X |
| 4,673,834 | 6/1987 | Wrobel ................................. 310/71 |
| 4,982,124 | 1/1991 | Cummings et al. ................... 310/71 |
| 5,032,749 | 7/1991 | Stone ................................ 310/71 X |

*Primary Examiner*—Steven L. Stephan
*Assistant Examiner*—Ed To
*Attorney, Agent, or Firm*—Jones & Askew

[57] ABSTRACT

An electric motor 2 with a stator 22 comprising a stator plate packet 24 and coils located in grooves of the stator plate packet 24, and a plug connector device 30 for connecting wire ends 32 of the coils 28 with motor connector leads 34. The plug connector device 30 has retaining elements 38 composed of insulating material and holding electrical connector elements 36. Each retaining element 38 is located in the region of one of the grooves 26 lying between the coils 28, and the wire ends 32 are connected to connector elements 36 on one side, and the connector leads 34 are connectable via plug connectors 40 on the other side. The retaining elements 38 are mounted at a form-fit in plug connectors 44 formed by insulating end disks 42 of the stator 22.

16 Claims, 3 Drawing Sheets

ELECTRIC MOTOR WITH CONNECTOR PLUG IN STATOR GROOVE

The present invention pertains to an electric motor with a stator consisting of a stator plate packet and coils located in grooves of the stator plate packet, and with a plug connector device for switching of wire ends of the coils with motor connector leads, where the plug connector device has retaining elements composed of insulating material and holding electrical connector elements, and each retaining element is located in the region of one of the grooves lying between the coils, and where the wire ends are connected to the connector elements on the one side, and the connector leads are connectable via plug connectors on the other side.

DE-OS 29 24 906 describes an electromotor of the stated type designed as an outside-rotor motor, where the retaining element of the plug connector device is inserted directly into the groove, and where the free grove space is filled and holds the coils in their position. But this can also lead to problems since the retaining element cannot be securely mounted in the groove in all cases, due to the dimensional tolerances occurring in the coils, or the difficulty of insertion into the groove. Axial movement of the retaining elements, in particular the connector elements, must be prevented in every case, because the connected wire ends of the coils could break off. But on the other hand, a certain play is required to allow a simple and fast assembly.

From DE-OS 22 19 764 we also know about a related electric motor designed as an internal rotor motor. The retaining elements of this motor sit loosely in the grooves, or in modified designs, they wrap around the stator plate packet from the front side. Here too, the mount of the retaining elements to the stator is less than optimum.

Thus the present invention is based on the problem of improving the plug connector device in a motor of the described type, so that a simple, fast and thus low cost assembly is possible, while simultaneously also assuring good mounting of the retaining elements.

According to the invention this is achieved since the retaining elements are mounted at a form-fit in plug connectors formed by insulating end disks of the stator.

Due to this inventive configuration, the mounting elements need only be inserted in an axial direction into the plug connectors formed by the end disks, and due to the form-fitted seat, an optimum mounting of the retaining elements will be achieved. Since the plug-in holders can be very tightly adapted to the dimensions of the retaining elements, a mounting of the retaining elements will always have the same high quality for any type of motor, that is, the attachment is independent of dimensional tolerances in the area of the coils.

The invention will be explained in detail below, based on a sample, preferred design shown in the figures. We see:

FIG. 1: An axial cross section through an electromotor designed according to the invention as an internal rotor motor, used here as a drive motor for a ventilator (example only)

Figure 2:
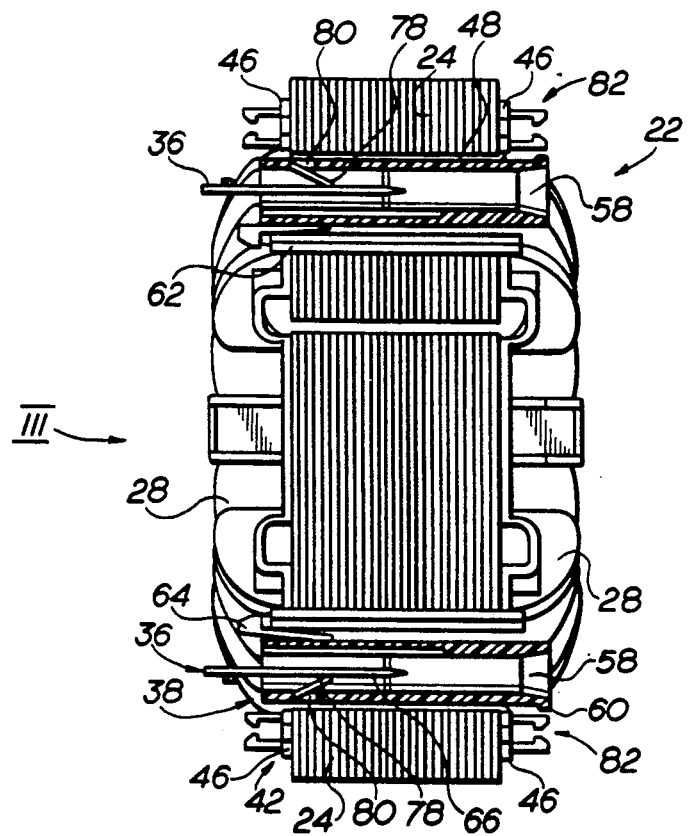

FIG. 2: A regional, axial cut side view of the stator of the invented motor

Figure 3:
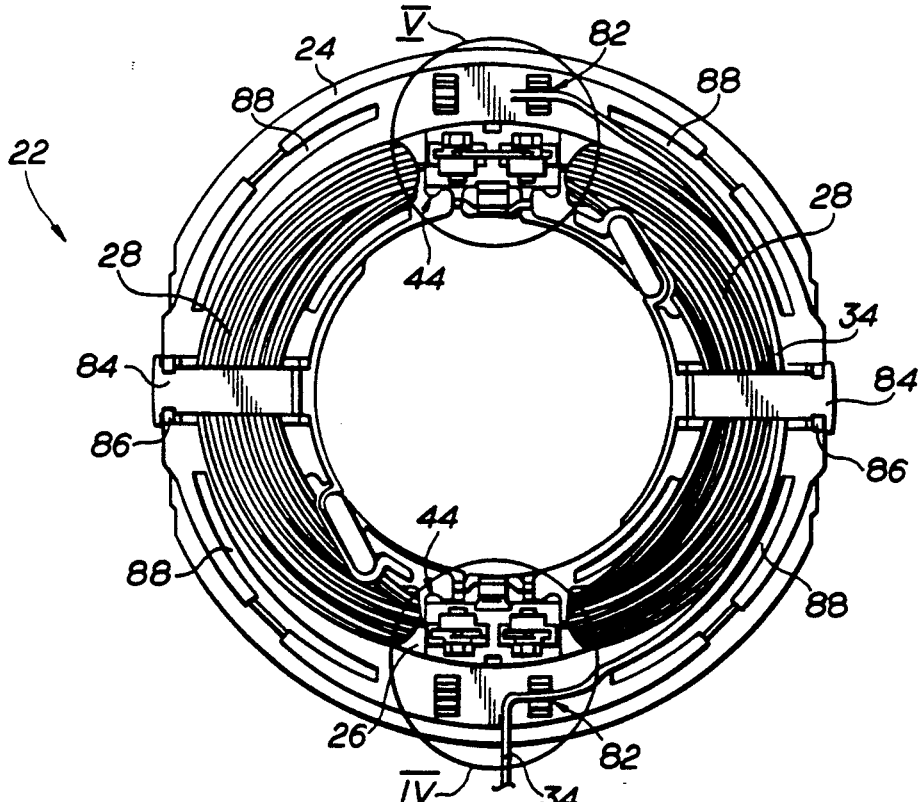

FIG. 3: A front view of the stator in the direction of arrow III of FIG. 2

Figure 4:
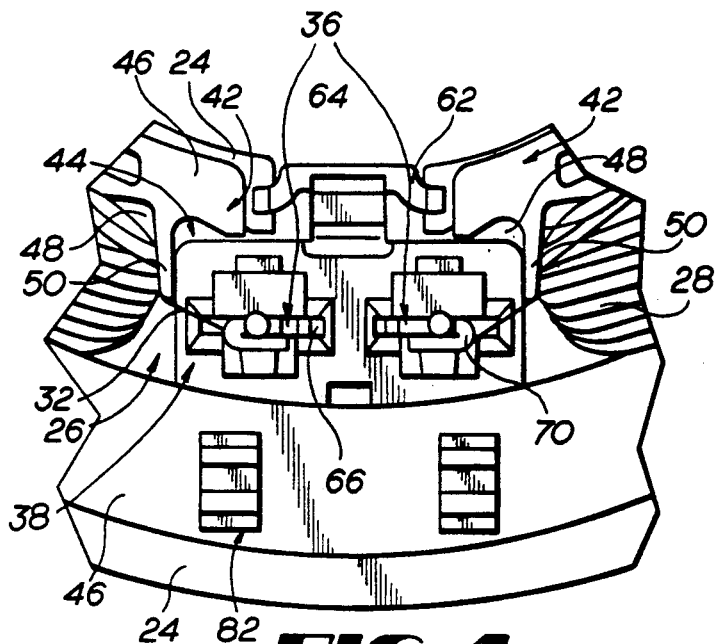

FIG. 4: An enlarged representation of region IV in FIG. 3

Figure 5:
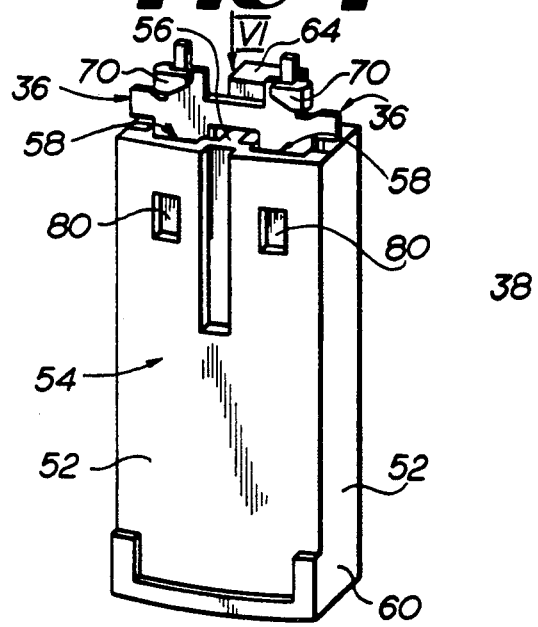
Figure 6:
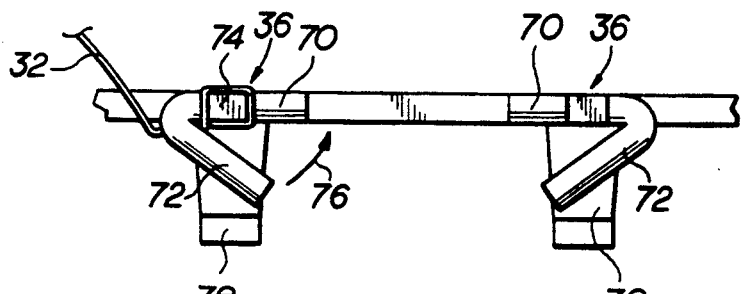

FIG. 5: An enlarged, perspective representation of a retaining element from region V in FIG. 3 populated with connector elements, and FIG. 6: An enlarged, top view, compared to FIG. 5, in the direction of arrow VI of the connector elements with a connected coil wire end.

In the various figures the same parts always bear the same reference numbers and thus as a rule are each described only once.

According to FIG. 1, an electric motor 2 according to this invention is the drive motor of a ventilator 4 having an outer wall ring 6 and a motor flange 10 held centrally by means of radial spokes 8. The motor flange 10 has a bearing support tube 12 and a rotor 14 is rotary mounted therein by means of a rotor shaft 16 and glide bearing 18 (upper half of FIG. 1) or roller bearing 20 (lower half of FIG. 1).

A stator 22 of the electric motor 2 is mounted to the bearing support tube 12. As is shown more clearly in FIGS. 2 and 3, this stator 22 is composed of a segmented stator plate packet 24 and of coils 28 positioned in grooves 26 of the stator plate packet 24. The invented electric motor 2 also has a plug connector configuration 30 for switching of wire ends 32 of coils 28 with motor connector leads 34. The plug connector configuration 30 has retaining elements 38 made of insulating material and holding electrical connector elements 36, whereby each retaining element 38 is located in the region of one of grooves 26 lying between coils 28. On the one side, the wire ends 32 of stator coils 28 are connected to the connector elements 36, and on the other side, the connector leads 34 are connectable via plug connectors 40 (FIG. 1).

According to the invention, the retaining elements 38 are held form-fitted in plug connectors 44 formed by insulating end disks 42 of stator 22. The plug connectors 44 are prominently shown in the enlargement of FIG. 4.

The end disks 42 should be made of premolded plastic, each consisting of a disk section 46 lying on a front side of the stator plate packet 24, and also of insulating bars 48 running in an axial direction into the grooves 26 and completely lining their surfaces. In addition, according to the invention, end disks 42 pass through grooves 26, especially by overlapping of the insulating bars 48 in the central region of the stator plate packet 24, and mesh formfitting into each other (see especially FIGS. 1 and 2). To form invented plug connector 44 for retaining elements 38, guide bars 50 are located at the inner (as seen in a radial direction) insulating bars 48 of the end disks 42; these guide bars on one side run axially and extend in an axial and thereby essentially radial direction as well as parallel to each other into the grooves 26; see FIG. 4.

According to FIG. 5, each retaining element 38 consists preferably of a housing 54 with an essentially rectangular cross section formed by four walls 52; said housing is divided preferably by a separating wall 56 into two axial receiving chambers 58 open on both sides, each containing one connector element 36.

Due to the invented configuration, the retaining elements 38 will thus be held in a radial direction in a form-fit between the insulating bars 48 and in the circumferential direction, they will be held between the guide bars 50.

For a form-fitted mount in an axial direction, each retaining element 38 per FIG. 1 has on one end at least one lug 60 pointing radially outward (see also FIG. 5) and touching the front face of one of the end disks, and on the other end, a second lug 64 pointing radially inward and moving axially back behind a groove closing unit 62. The groove closing element 62 in FIG. 4 is designed as a scatter plate which is pushed in an axial direction into two guide grooves of two opposing pole peaks of the stator plate packet 24. One of the lugs 60, 64 and in particular, the radially inward-pointing, second lug 64, can be designed as an elastic snap hook moving in a radial direction, to form a snappable, form-fitted closure. In this case, first the groove closing unit 62 can be mounted, and then the retaining element 38 can be inserted into the plug connector 44 in an axial direction, until the spring-elastic snap hook snaps into the end of the groove closing element 62. In the case of lugs 60, 64 rigidly connected to the retaining element 38, first the retaining elements 38 will be pushed into the plug connector 44, and the form-fitted mount then takes place by pushing in the groove closing elements 62.

The connection of wire ends 32 and of the connector lead 34 takes place in the plug connector device 30 of the invented electric motor 2 on axially opposite sides of the stator 22. In particular, the connector lead 34 is connected on the side of the motor flange 10 and the wire ends 32 are connected on the axially opposite side turned away from the motor flange 10. For this purpose, the connector elements 36 mounted in the retaining elements 38 are made of a plug section 66 designed as a flat plug and located within the retaining element 38, for plugging in a plug 68 connected to the connector lead 34 and also a connecting section 70 extending outward over the retaining element 38 for the wire end 32 of coil 28. Now the wire ends 32 are each joined, to one of the connector elements connecting section 70 of the connector elements 36. According to FIG. 6, each connecting section 70 has on one side, a curved clamping strip 72 and a mounting strip 74 located above it, and the coil wire end 32 is run between the connecting section 70 and the clamping strip 72 and for preliminary attachment, it is run around the mounting strip 74. The electrical connection is then made preferably by pressure welding, and the clamping strips 72 are pressed in the direction of the arrow 76 (FIG. 6) against the connecting section 70 and the sections are welded together at the same time. Due to this welding step, the insulation of the coil wire is eliminated, so that an electrically conducting connection is created. Or alternatively, a solder joint could just as easily be used.

The connecting elements 36 are form-fitted in the retaining elements 38. This is done by forming two facing, opposing guide grooves in the holding chambers 58 of the retaining elements 38; the connector elements 36 designed as flat plugs, can be pushed into them. For mounting in the axial direction, curved spring tongues 78 (FIG. 6) are used; they snap into a recess 80 of one of the walls of the retaining element housing 54 (FIGS. 1 and 2).

In a favorable refinement of the invention, the end disks 42 have clamp mounts 82 in regions bounding the retaining elements 38 for fixing in place the connector lead 34 running in from the outside. Each of these clamp mounts 82 is formed by two clamping fingers extending axially from the disk sections 46; the connector lead 34 is clamped between them. As illustrated in FIG. 3 for example, by means of these clamp mounts 82 for switching the stator coils 28, the connector lead(s) 34 can be run from one inlet side out to the radially opposite side of the stator. But in FIG. 3 this is shown only for illustration, although the connector leads are in reality located on the front side of the stator (not visible in this figure).

In the illustrated, preferred design of the invention, the end disks 42 also have mounting lashings 84 in the region of the coils 28 that are mounted on one end, especially in a single piece, via a film hinge joint allowing a pivot motion so that they can be folded away in a radial direction over coils 28 and can be attached by their free ends via snap features 86 (see FIG. 3 in particular). These mounting lashings 84 can then be used to mount the connector lead 34 (run to the opposite side for switching) to the coils.

For additional mounting of the coils, the end disks 42 have guide bars 88 extending radially on both sides of the coils 28 in an axial and circumferential direction. The connector leads 34 provided for switching, run preferably and according to FIG. 3, between the coil and the outer guide bars 88 in a radial direction.

As can also be seen in FIG. 1, a connection opening is formed in the motor flange 10; this opening can be closed by a snap-on cover 90. Now the connection opening and the cover 90 extend preferably out beyond the central region of the rotor mount 18, 20, so that by removal of cover 90, both the connection region and also the bearing region will be accessible from the outside.

Due to the invented configuration, mounting of the motor 2 can be performed quickly and very easily. First, push one end disk onto the front side ends of the stator plate packet. These end disks ensure a thorough insulation of the coil area for the coils to be inserted subsequently into the grooves. Now push the retaining elements populated with the connector elements, into the plug holder. And either lock it in place—as already described—by a snap-in, form-fitted connector, or by the pushed-on goove closing elements. Then comes the connection of the coil wire ends to the connector elements, and finally, the motor connector leads are inserted with their plugs onto the connector elements after final assembly of the motor.

The invention is not restricted to the illustrated and described sample design, but rather extends also to all design forms operating in the same manner defined by this invention.

I claim:

1. In an electric motor with a stator having a stator plate lamination packet (24) and windings (28) located in grooves (26) of the stator plate lamination packet, and with a plug connection device (30) for connecting wire ends (32) of the windings (28) with motor connector leads (34), wherein the plug connection device (30) has electrical plug connector elements (36), each of which is located in the region of one of the grooves (26) between the windings (28), and wherein the wire ends (32) are connected to the plug connector elements on their one side, and the connector leads are connectable via plug connectors on the other side of the plug connector elements (36), and the stator plate lamination packet (24) is associated with insulating end disks (42) forming receptacles (44) for retaining said plug connector elements (36), the improvement comprising; separate retaining elements (38) composed of insulating material and mounted in said receptacles (44) of the insulating end disks (42) in a form-fit arrangement whereby said electrical plug connector elements (36) are arranged in said retaining elements (38) so that the plug connector elements (36) are indirectly retained in said receptacles (44) by means of said retaining elements (38).

2. An electric motor according to claim 1, wherein the end disks (42) comprise preformed plastic pieces and are each made of a disk section (46) lying on one front face of the stator plate lamination packet (24), and further comprising insulating bars (48) running in an axial direction into the grooves (26) and lining them.

3. An electric motor according to claim 2, wherein the end disks (42) mesh into each other through the grooves (26) by overlapping the insulating bars (48) in a form-fit.

4. An electric motor according to claim 2, wherein the insulating bars (48) of the end disks (42) have axially running guide bars (50) extending roughly radial and parallel to each other in the grooves (26) to form the receptacle (44) for the retaining elements (38).

5. An electric motor according to claim 1, wherein the retaining elements (38) have an essentially rectangular cross section housing (54) formed by four walls (52), and said housing is divided by a separating wall (56) into two axial receiving chambers (58) open on both sides, each containing one connector element (36).

6. An electric motor according to claim 1, wherein for a form-fitted mount in the axial direction, the retaining elements (38) have on one end at least one radially outward-pointing lug (60) touching the front face of one of the end disks, and have on the other end a radially inward-pointing lug (64) moving axially back behind a groove closing unit (62).

7. An electric motor according to claim 6, wherein one of the lugs (60, 64) of the retaining element is shaped as a snap hook moving under spring tension in a radial direction, to form a snap-in, form-fitted connection.

8. An electric motor according to claim 1, wherein the connector leads (34) are connected to the side of a motor flange (10) bearing the stator (22), and the wire ends (32) are connected on the axially opposing side.

9. An electric motor according to claim 1, wherein the connector elements (36) comprise a plug section (66) located within the retaining elements (38) for plugging in a plug (68) connected to the connector leads (34), and also a connector segment (70) for the wire end (32) extending outward over the retaining element (38).

10. An electric motor according to claim 1, wherein the wire ends (32) are joined by a metal connection to the connector elements (36).

11. An electric motor according to claim 1, wherein the connector elements (36) are form-fitted in place in the retaining elements (38).

12. An electric motor according to claim 1, wherein the end disks (42) have clamp mounts (82) for fixing the connector lead (34) in place in regions bounding the retaining elements (38).

13. An electric motor according to claim 1, wherein the end disks (42) have mounting lashings (84) in the region of the windings (28) that are mounted on one end via a film hinge joint allowing a pivot motion so that they can be folded away in a radial direction over the windings (28) and can be attached by their free ends via snap features (86).

14. An electric motor according to claim 1, wherein the end disks (42) have guide bars (88) extending radially on both sides of the windings (28) in an axial and circumferential direction.

15. An electric motor according to claim 1, wherein a connection opening is formed in a motor flange (10) connected with the stator, the connection opening being selectably closeable by a snappable cover (90).

16. An electric motor according to claim 15, wherein the connection opening and cover (90) extend out beyond the central region of a rotor bearing (18, 20).

* * * * *